United States Patent
Grochla et al.

(10) Patent No.: US 9,037,178 B1
(45) Date of Patent: *May 19, 2015

(54) SYSTEMS AND METHODS FOR MANAGING WIRELESS LINKS

(71) Applicant: Thales Avionics, Inc., Irvine, CA (US)

(72) Inventors: Krzysztof Ronald Grochla, Pyskowice (PL); Yair Bourlas, San Diego, CA (US); Maciej Zenon Borzecki, Lodz (PL); Bartlomiej Piotr Swiercz, Lodz (PL); Jaroslaw Piotr Dzierzega, Wodzislaw Slaski (PL); Krzysztof Waclaw Jaskiewicz, Lodz (PL); Aleksander Karol Seman, Rybnik (PL)

(73) Assignee: Thales Avionics, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/295,210

(22) Filed: Jun. 3, 2014

Related U.S. Application Data

(63) Continuation of application No. 13/350,745, filed on Jan. 14, 2012, now Pat. No. 8,781,512.

(60) Provisional application No. 61/550,393, filed on Oct. 22, 2011.

(51) Int. Cl.
   *H04B 7/00* (2006.01)
   *H04W 48/20* (2009.01)

(52) U.S. Cl.
   CPC .................................... *H04W 48/20* (2013.01)

(58) Field of Classification Search
   CPC ............ H04B 17/0077; H04L 12/2602; H04L 12/5695; H04L 1/20; H04L 41/5003; H04L 41/5009; H04L 43/00; H04L 47/14; H04L 47/15; H04L 47/822; H04L 47/823; H04W 24/00; H04W 24/10; H04W 28/18; H04W 72/12; H04W 72/1278
   USPC ........... 455/67.11, 67.13, 517, 450–453, 455, 455/522, 524, 509; 370/229, 316, 329, 267, 370/342, 252, 253, 328, 341, 479
   See application file for complete search history.

(56) References Cited

U.S. PATENT DOCUMENTS

| | | | |
|---|---|---|---|
| 7,961,671 | B2 | 6/2011 | Byun |
| 2006/0293079 | A1 | 12/2006 | Bahl |
| 2007/0153801 | A1 | 7/2007 | Sung |
| 2008/0056172 | A1 | 3/2008 | Nakatsugawa |
| 2009/0097583 | A1 | 4/2009 | Shin |
| 2011/0038272 | A1 | 2/2011 | Hadad |
| 2011/0051709 | A1 | 3/2011 | Roberts |

FOREIGN PATENT DOCUMENTS

| | | |
|---|---|---|
| EP | 2348772 | 7/2011 |
| WO | 2009140045 | 11/2009 |

*Primary Examiner* — Sujatha Sharma
(74) *Attorney, Agent, or Firm* — Myers Bigel Sibley & Sajovec, P.A.

(57) ABSTRACT

Systems and methods for increasing a combined data rate for communication links between a plurality of radio systems and a plurality of base stations.

12 Claims, 6 Drawing Sheets

SYSTEMS AND METHODS FOR MANAGING WIRELESS LINKS

FIELD OF THE INVENTION

Embodiments of the present invention relate to systems and methods for establishing wireless communication between multiple radio systems and multiple base stations.

BACKGROUND OF THE INVENTION

A vehicle may include a communication system for establishing wireless communication between the vehicle and a communication infrastructure (e.g., access points, base stations; wireless systems, networks, local area networks, metropolitan area networks, global systems for mobile communications). A vehicle having a communication system may benefit from managing the wireless links between the radio systems of the communication system and the base stations to increase the overall throughput (e.g., data rate) between the radio systems and the communication infrastructure.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
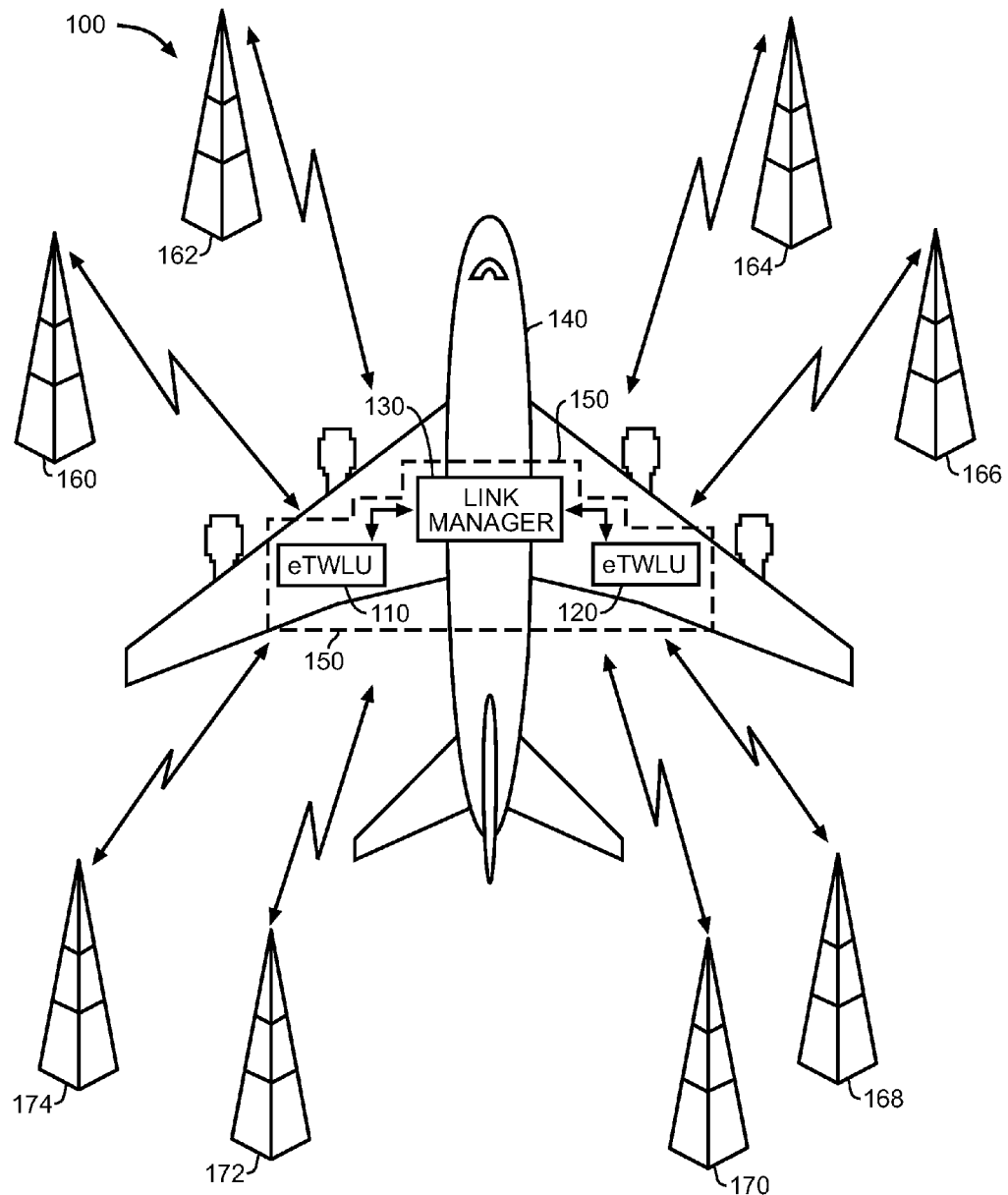
FIG. 1 is a diagram of an aircraft that communicates with wireless base stations at a location using a communication system according to various aspects of the present invention.

The following US patent, patent publications, and patent application are incorporated herein by reference for all that they describe: U.S. Pat. No. 8,010,141 issued Aug. 30, 2011; US patent publication no. 2010/0291960 filed Apr. 29, 2010; US patent publication no. 2009/0070841 filed Sep. 12, 2008; and U.S. patent application Ser. No. 12/951,007 filed Nov. 20, 2010.

A vehicle may include a communication system. A communication system may be onboard (e.g., on, in, installed in, within, a part of, positioned in, transported by) a vehicle. A communication system of a vehicle may communicate with a wireless network when the vehicle moves into range of the wireless network. Communication includes transmitting, transferring, providing, and receiving information (e.g., data, content, video data, voice data voice data). Wireless communication may be accomplished using one or more of any conventional communication protocol (e.g., IEEE 802.11 wireless LAN, IEEE 802.16 WiMax, Bluetooth, GSM). A wireless network includes any conventional wireless network (e.g., IEEE 802.11 wireless LAN, IEEE 802.16 WiMax, Bluetooth). A communication system may communicate with one or more wireless networks. Communication with more than one communication network may occur at the same time. A communication system may communicate with devices (e.g., servers, computers) accessible via a wireless network. A wireless network may provide access to devices on a wired network.

Wireless communication protocols generally define a mobile device and a fixed point device that communicates wirelessly with the mobile devices. For example, the IEEE 802.11 wireless protocol (e.g., WiFi) refers to the fixed-point devices a "access points" while the IEEE 802.16 wireless protocol (e.g., WiMax) refers to fixed point devices as "base stations". For the purposes of this application, the term "base station" refers to fixed-point devices (e.g., base station, access point, cell tower) regardless of the term used by a particular wireless protocol.

Communication between a communication system and one or more wireless networks may occur via one or more wireless links. A wireless link (e.g., connection, channel) includes any conventional wired and/or wireless channel. A wireless channel may include a baseband frequency, a bandwidth, a portion of a bandwidth, and/or a type of modulation/demodulation. A channel may be full-duplex or half-duplex. A link may be formed using any conventional wireless communication protocol. An active link includes a link established for communication. An inactive link includes a link that has been terminated. No communication may occur via an inactive link. A communication system may communicate via two or more links that use different communication protocols at the same time.

A communication system onboard a vehicle may be used to communicate information about the vehicle (e.g., geographic location, operation parameters, operation history, crew actions) and/or information for use by occupants of the vehicle (e.g., navigation information, crew instructions, news, occupant communications, entertainment). Wireless networks may be positioned proximate to a location (e.g., gate, service area, terminal, dock) frequented by vehicles. A communication system onboard a vehicle may communicate information via the wireless networks while positioned proximate to the location and while in range of the wireless networks. A communication system may communicate while the vehicle is in motion or while the vehicle is at rest. A communication system may communicate with base stations at a location while at rest on the ground. For example, a communication system onboard an aircraft may communicate with base stations position proximate to a gate while the aircraft is parked at the gate.

A communication system may store information received while at a location. A communication system may store information while away from a location for communication upon arrival at a location. For example, a communication system onboard an aircraft may receive entertainment (e.g., news, movies, music) information while positioned at a gate at an airport. The entertainment information may be stored by the communication system for use by the occupants of the aircraft while inflight. While in flight, the aircraft may store information regarding the operation (e.g., engine speed, engine parameters, fuel usage, temperature, altitude, crew actions) of the aircraft. Upon arrival at the gate, the communication system may transmit the stored information regarding the operation of the aircraft to a wireless network.

A vehicle may be positioned at a location for communication for a limited amount of time. A vehicle may need to communicate an amount (e.g., Megabits, Megabytes, Gigabits, Gigabytes, number of files, number of VoIP connections) of information while positioned at the location. A communication system may use one or more communication links to communicate the amount of information during the time the vehicle is at the location. As discussed above, a communication system may use two or more links at the same time to communicate the information during the allotted time. The links may use the same or different communication protocols.

A wireless link may communicate information at a data rate (e.g., Mbit/sec, Mbytes/sec). A data rate of a wireless link may be determined, at least in part, by the communication protocol used by the link, encoding, modulation, the distance between the communication system onboard the vehicle and the base stations of the wireless networks, sources of interference (e.g., other vehicles, objects proximate to location), transmit power, and movement of the vehicle. Signal strength further provides information regarding a data rate of communication. Signal strength may be measured at a receiver and/or a transmitter. Received signal strength may be measured at a receiver. Measurements of signal strength include carrier to noise plus interference ration (e.g., CINR), carrier-to-noise ration (e.g., CNR), signal-to-noise ration (e.g., SNR), signal-to-interference ratio (e.g., SIR), signal-to-noise and distortion ratio (e.g., SINAD), received signal level (e.g., RSL), and average signal level.

A communication system may detect a data rate of one or more links. A communication system may detect a data rate of one or more links over time. A communication system may maintain a record of a data rate of a data link over time. A communication system may select one or more links for communication in accordance with the data rate of the one or more links. A communication system may select one or more links for communication in accordance with a data rate of each individual link and/or a combined (e.g., summed, total) data rate of one or more links. A communication system may select two or more links to provide a combined bit rate. A communication system may select two or more links to provide a data rate sufficient for communicating information during a vehicle's stay at a location. A communication system may select two or more links to provide a data rate that is the highest combined data rate for two or more radio systems of the communication system.

A data rate for a link may change over time. A communication system may detect a change in the data rate of a link. In accordance with detecting the data rates of links, a communication system may select more and/or different links for communication. A data rate may be estimated in accordance with a quality of a link between a communication system and a base station.

Figure 2:
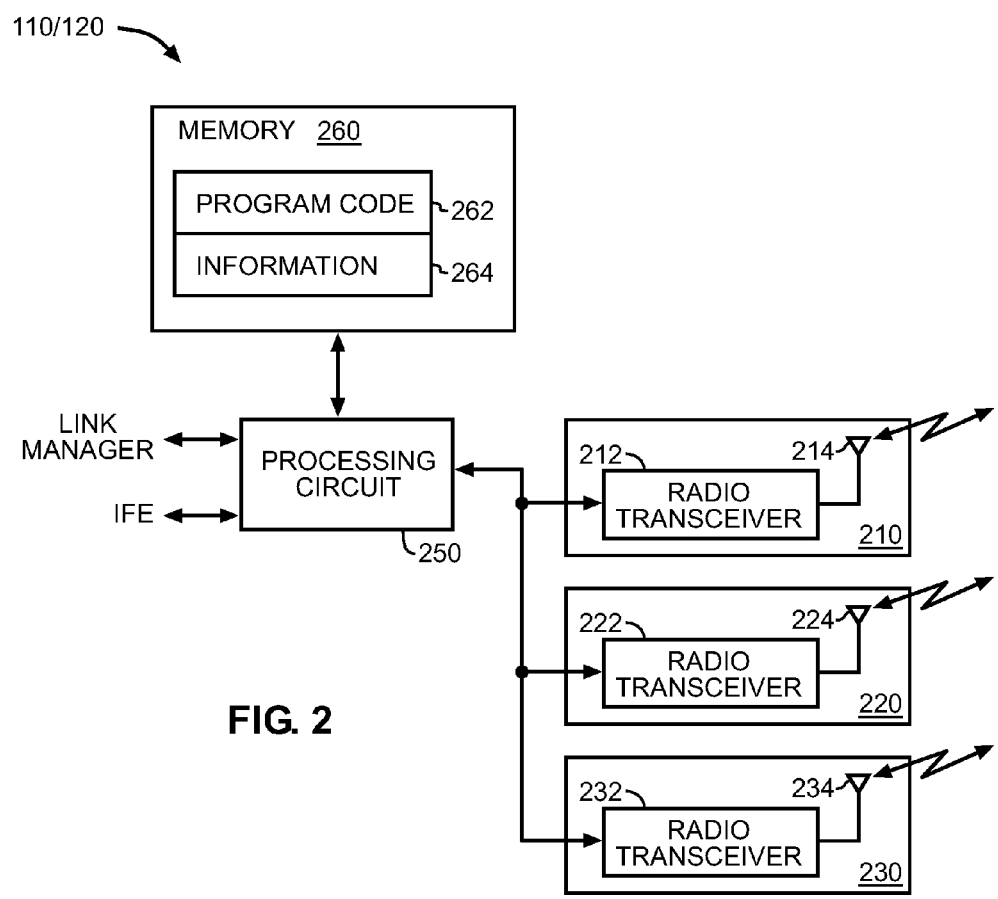
FIG. 2 is a functional block diagram of an enhanced terminal wireless LAN Unit ("eTWLU") of the communication system of FIG. 1.
Figure 3:
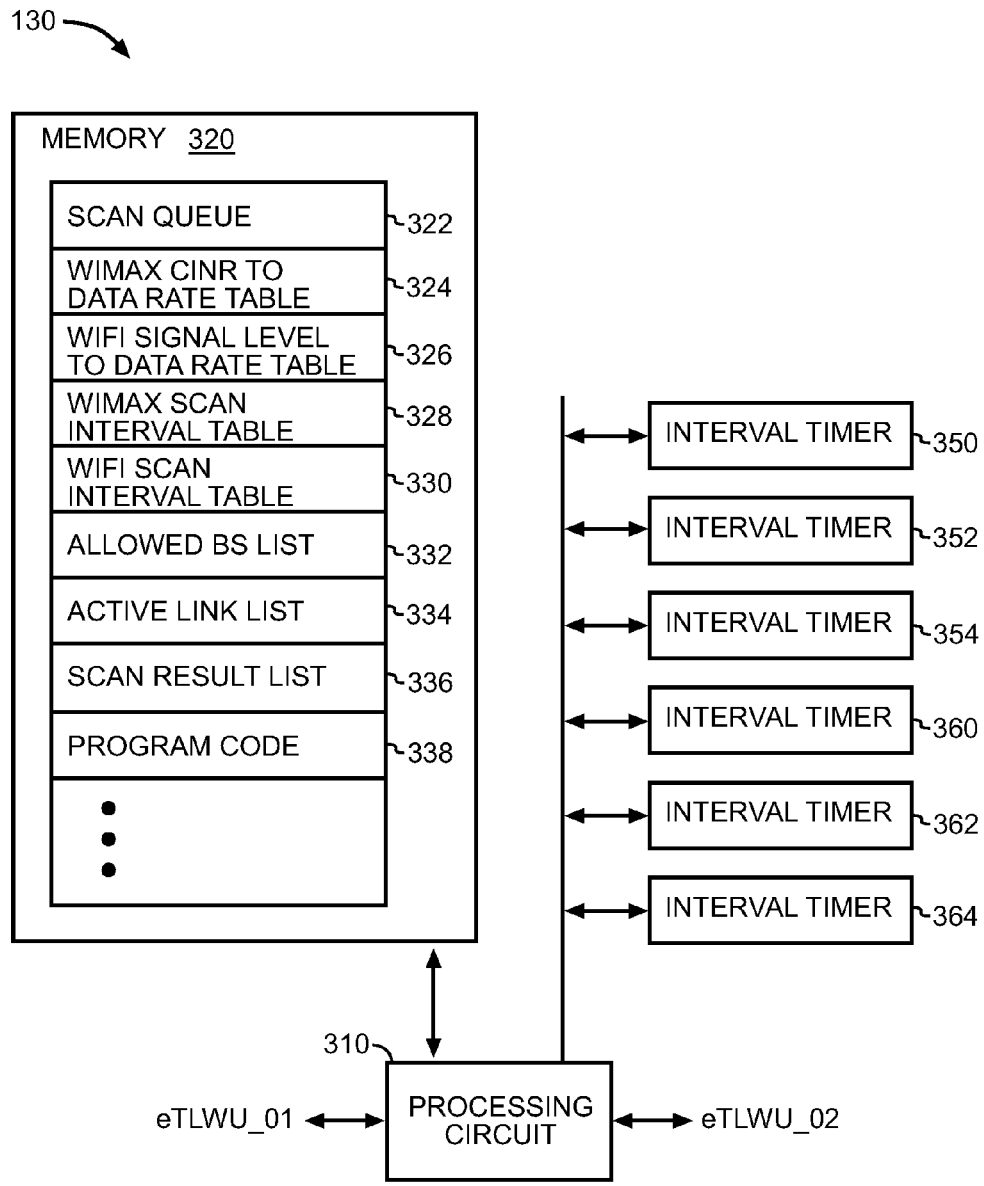
FIG. 3 is a functional block diagram of a link manager of the communication system of FIG. 1.
Figure 4:
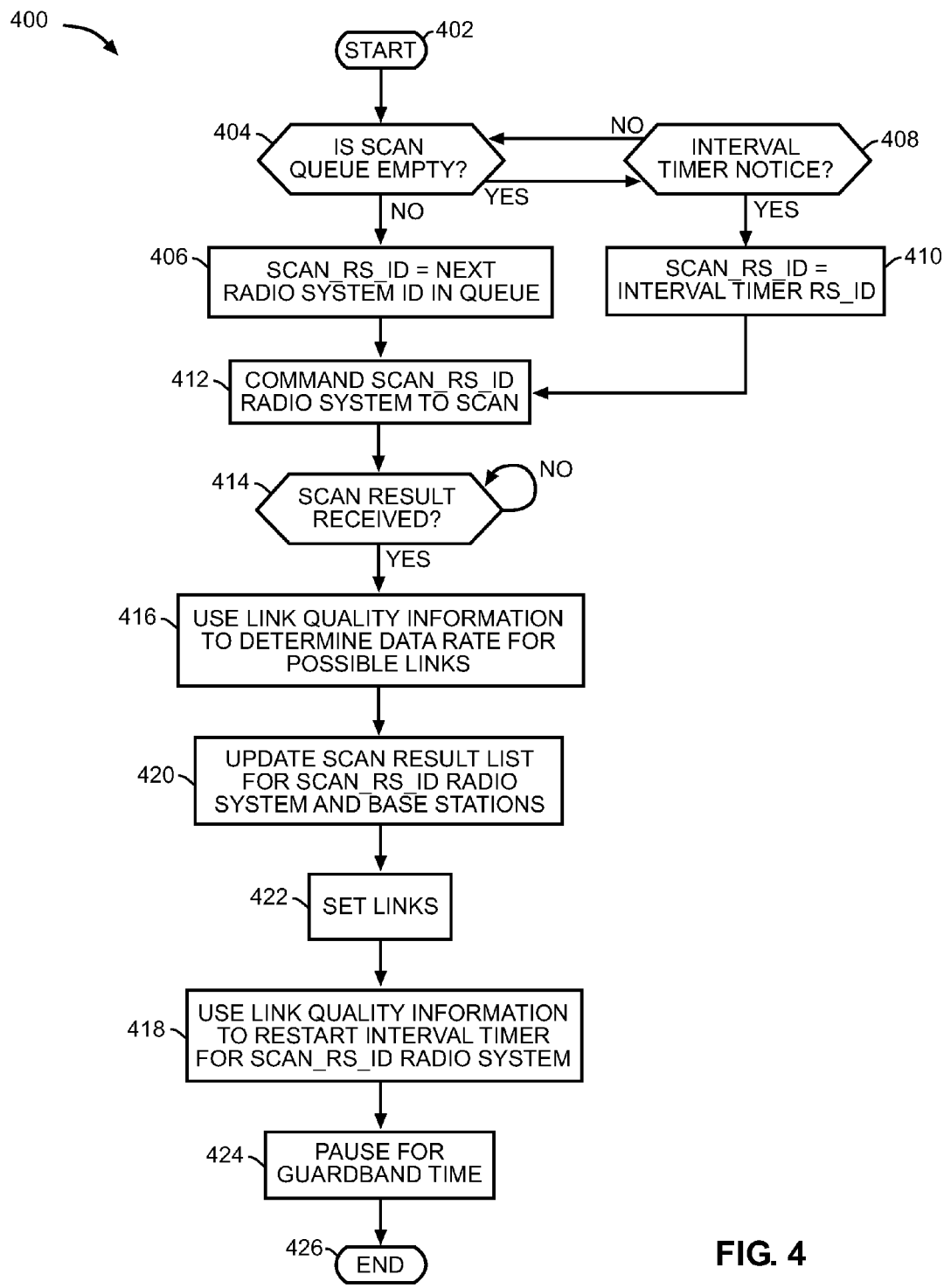
FIG. 4 is process flow diagram of a method for performing scanning using radio systems of the communication system of FIG. 1.
Figure 5:
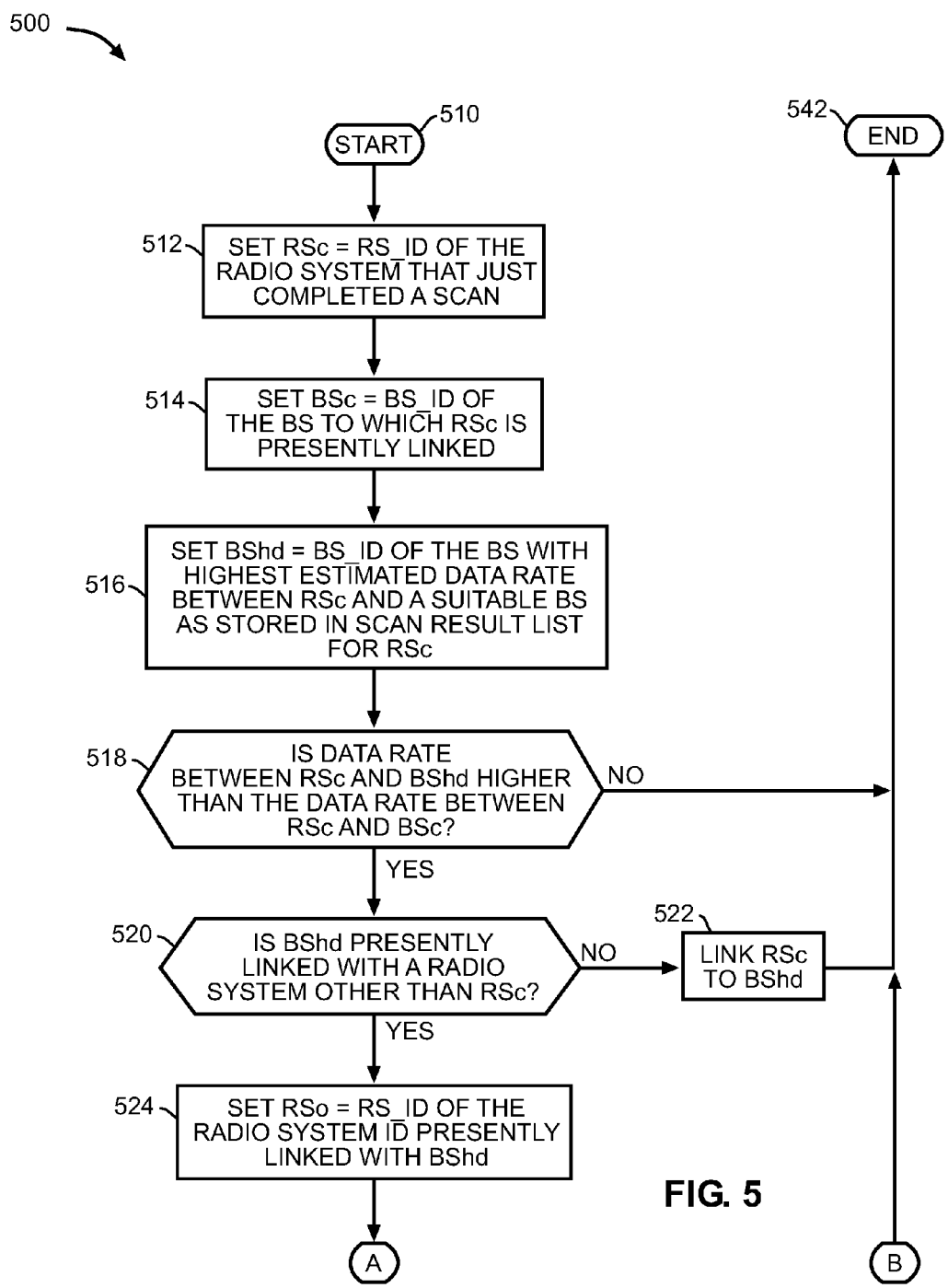
FIGS. 5-6 are process flow diagrams of a method for managing wireless links, according to various aspects of the present invention, of the communication system of FIG. 1.
Figure 6:
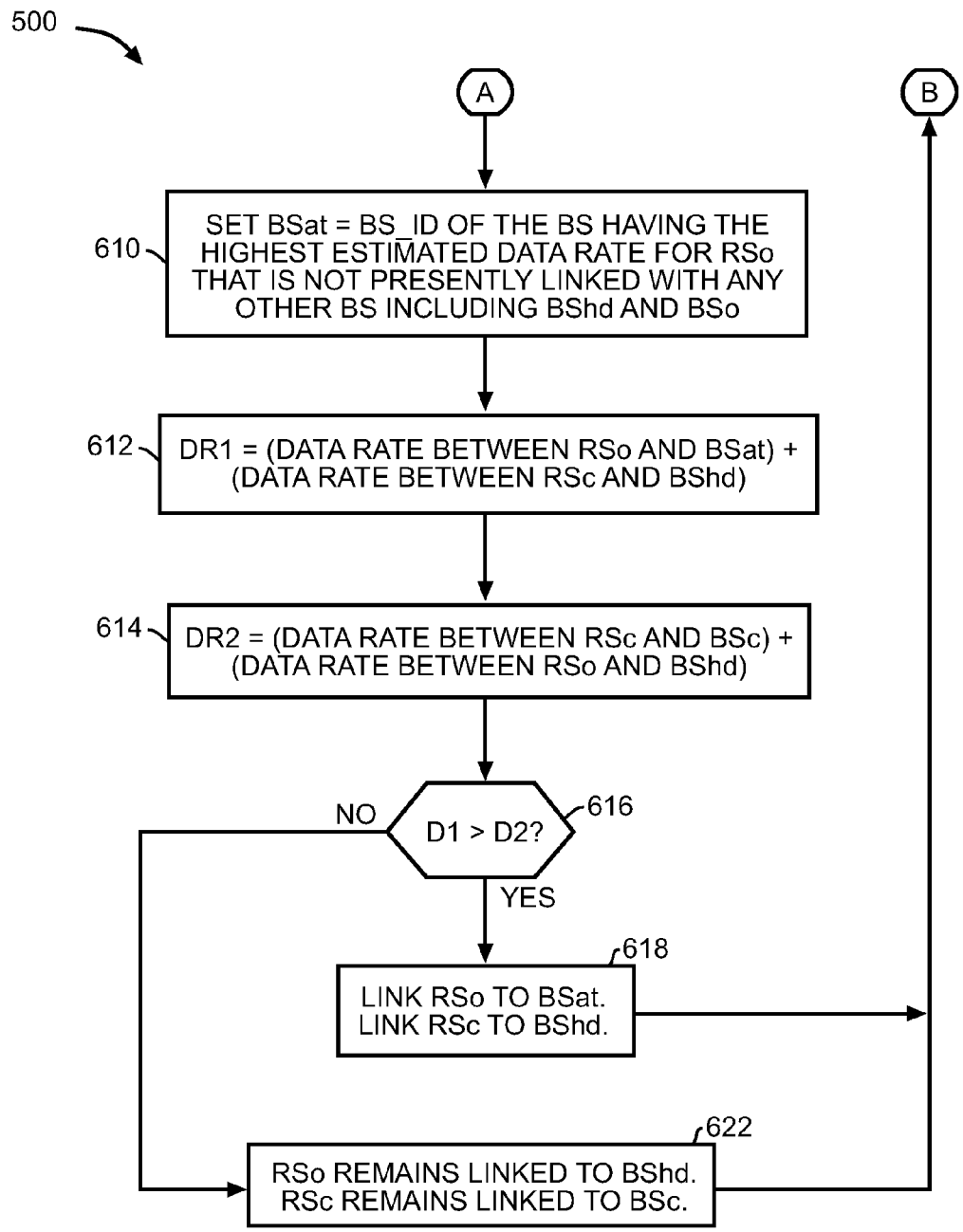

For example, communication system 150 of FIGS. 1-6 performs the functions of a communication system discussed above. Communication system 150 is positioned onboard aircraft 140. Base stations 160-174 are positioned proximate to an airport. Aircraft 140 may communicate with base stations 160-174 while in wireless communication range of stations 160-174. In one implementation, aircraft 140 communicates with base stations 160-174 while aircraft 140 is on the ground at the airport, so aircraft 140 communicates with base stations 160-174 at any time after landing, but before take-off. Base stations 160-174 may be positioned within the boundaries of the airport and/or outside the boundaries of the airport, but within wireless communication range of the airport, the facilities of the airport, and the aircraft.

In one implementation of communication system 150 in accordance with various aspects of the present invention, communication system 150 includes enhanced terminal wireless LAN Unit ("eTWLU") 110, eTWLU 120, and link manager 130.

An eTWLU may communicate via a link established with one or more wireless base stations. An eTWLU may store information received via the link. An eTWLU may store information while out of range of a wireless network for later transmission when a link is established with a network. An eTWLU may include any conventional storage device (e.g., semiconductor memory, magnetic, optical) for storing information. An eTWLU may provide information to an inflight entertainment ("IFE") system of aircraft 140. An eTWLU may provide information related to operation of the radio systems and/or base stations. An eTWLU may establish a link with a wireless network for communication (e.g., VoIP) by occupants of the vehicle. An eTWLU may detect a quality (e.g., SINR, SNR, signal level, interference) of a link between the eTWLU and a base station.

An eTWLU may communicate with a link manager. Communication with a link manager may include wired and/or wireless communication using any conventional communication protocol. An eTWLU may provide information to a link manager. Information provided by an eTWLU to a link manager may include information related to the operation (e.g., link quality, association status) of radio systems of an eTWLU. An eTWLU may receive information and/or control commands (e.g., instructions) from a link manager. An eTWLU may receive a instruction from a link manager to perform a function (e.g., scan using a radio system; provide radio performance information).

An eTWLU may be positioned at a first location in a vehicle. Another eTWLU may be positioned at a second location in a vehicle. The first location may be proximate to the second location. The first location may be distance from the second location. An eTWLU positioned at a first location may provide better communication performance (e.g., more robust, higher data rate, higher SINR, higher SNR, higher throughput, higher signal levels, less interference) with some base stations of base stations 160-174 than an eTWLU positioned at a second location. An eTWLU at the first location and an eTWLU at the second location may cooperate to provide better communication performance with all or most of base stations 160-174.

An eTWLU at a first location and an eTWLU at a second location may establish wireless links with one or more base stations for communication with devices accessible via the networks coupled to the base stations. Devices on the base station networks may include servers, storage devices, routers, and other conventional devices associated with a network. Devices on the base station networks may include the internet.

A link manager may select (e.g., control, manage) the links established by an eTWLU with one or more base stations, monitor the links between the an eTWLU and one or more base stations, command an eTWLU to collect information about the quality of a link (e.g., link quality, link quality information) between an eTWLU and one or more base stations, and estimate the data rate of a possible (e.g., may be established) link between a radio system of an eTWLU and a base station. A link manager may communicate with one or more eTWLUs. Communication between a link manager and one or more eTWLUs may be accomplished via a wired and/or wireless link. A link manager may control (e.g., manage, request, command, instruct) operations of one or more eTWLUs. An eTWLU may provide a notice of completion of an operation to a link manager. An eTWLU may confirm completion of an operation requested by a link manager.

In an implementation, eTWLU 110 and eTWLU 120 each includes radio systems 210, 220, and 233, processing circuit 250, and memory 260. An eTWLU 110 and eTWLU 120 perform the functions of an eTWLU discussed above.

Each radio system 210, 220, and 233 includes conventional components, including radio transceivers 212, 222, and 232 and antennas 214, 224, and 234 respectively, for establishing a link with a base station for communication in accordance with a conventional wireless communication protocol.

A radio system wirelessly communicates with other devices. A radio system performs the functions of wireless communication discussed above. A radio system may associate with a base station to establish a wireless link. A radio system may communicate with devices coupled to the networks that service a base station. A radio system may communicate using any conventional wireless communication protocol. A radio system may receive information for transmission from a processing circuit. A radio system may provide received information to a processing circuit for storage, distribution, and/or use by occupants of a vehicle.

A radio system may provide information regarding quality of a link (e.g., CINR, CNR, SNR, signal levels, noise levels, fading, loss) to a processor. A processing circuit of an eTWLU may provide information regarding quality of a link (e.g., link quality information) to a link manager. Link quality information may be expressed as a value (e.g., a number). Link quality information may be expressed in units of decibels (e.g., dB). A radio system may provide link quality information responsive to a request from a processing circuit. A radio system may perform a function (e.g., scan) responsive to a request (e.g., command, instruction, control signal) from a processing circuit.

Radio systems 210-230 may establish a wireless link (e.g., associate with) base stations 160-174 for wireless communication. Antennas 214, 224, and 234 cooperate with radio transceivers 212, 222, and 232 respectively of radio systems 210-230 to establish a wireless link and to perform wireless communication. Antennas 214, 224, and 234 include any conventional antenna and/or antennas including, inter alia, omnidirectional, directional, MIMO, and steered beam array antennas. Radio systems 210-230 may communicate using any conventional wireless communication protocol as discussed above. Radio systems 210-230 may communicate using the same or different communication protocols. Radio systems 210-230 may communicate using the same or different communication channels. Two or more radio systems 210-230 may cooperate (e.g., bond) to communicate with a single base station.

Radio systems 210-230 may detect a quality of a link (e.g., link quality) between a radio system 210-230 and one or more base stations. A radio system may detect the quality of a link by performing a function referred to herein as scanning. Scanning includes any conventional operations performed by a wireless device to detect characteristics of a radio signal from another radio device. Radios systems 210-230 may scan one or more channels to detect a signal from one or more base stations. Scanning may be performed in accordance with the wireless protocol used by the radio system. Scanning may include detecting signals; determining CINR, CNR, SNR, RSL, noise level, fading, and/or loss. Scanning may include transmitting a signal. For example, scanning may include active and/or passive scanning as implemented by a system that is compliant with the IEEE 802.11 wireless protocol. Each radio 210-230 may provide a link quality value responsive to a scan of each base station at a location. Each radio 210-230 may provide a link quality value for each base station at a location. For example, radio 210 of eTWLU 110 may provide a link quality value for radio signals between radio 210 and each base station 160-174 (e.g., eight link quality values). Radio systems 210-230 may provide a link quality value to processing circuit 250. Processing circuit 250 may provide link quality information to link manager 130. Radio systems 210-230 may detect link quality responsive to a command from link manager 130.

A processing circuit performs an operation and/or controls performance of operations of an eTWLU as discussed above. A processing circuit may include any circuit for performing functions in accordance with a stored program. A processing circuit may include a processor and memory or a conventional sequential machine that executes microcode or assembly language instructions from memory. A processing circuit may include one or more microprocessors, microcontrollers, application specific integrated circuits, digital signal processors, programmable gate arrays, or programmable logic devices. A processor may control or coordinate the performance of a function performed by one or more components. A processing circuit may organize information for storage in a memory. A processing circuit may cooperate with a memory to receive program instructions to perform an operation. A processing circuit may cooperate with a radio system to send information to other devices (e.g., devices on a network) or to receive information from other devices (e.g., devices on a network).

Processing circuit 250 may be may be implemented with any conventional electronic devices and programming (e.g., firmware, software) for performing an operation and/or controlling an operation. Processing circuit 250 may cooperate with memory 260 to receive program code (e.g., instructions) 262 to perform an operation of an eTWLU. Processing circuit 150 may organize information received by radio systems 210-230 via wireless links for storage in information 264 of memory 260. Processing circuit 250 may receive information from other systems (e.g., engine, navigation) of a vehicle. Process circuit 250 may organize information received from other systems of aircraft 140 for storage in information 264 of memory 260. Processing circuit 250 may retrieve information from information 264 of memory 260 for transmission by radio systems 210-230 or for sending to another system (e.g., link manager, IFE) of aircraft 140.

A memory may include any conventional storage device as discussed above. A memory may receive information (e.g., data), store information, and provide access to (e.g., retrieve) information. A memory may provide access to information responsive to a request. A memory may store information in any conventional organization. A memory may provide information in any conventional organization. A memory may receive information organized for storage. A memory may store information permanently (e.g., non-volatile) and/or temporarily (e.g., volatile). A memory may provide information in parallel and/or in serial. A memory may store and provide access to instructions for execution by a processing circuit. A memory may store and/or provide variables and temporary data used by a processing circuit. A memory may store communication protocols or other information used to communicate using a radio system.

Memory 260 may store information about the operation of an eTWLU and/or any portion (e.g., component) of an eTWLU. Memory 260 may store and retrieve information received from a device on a network via a wireless link. Memory 260 may store and retrieve information about an operation of a vehicle.

In an implementation, link manager 130 includes memory 320, interval timers 350-364, and processing circuit 310.

Memory 320 may perform the functions of a memory discussed above. Memory 320 may include any of the conventional storage devices or a combination of conventional storage devices discussed above.

Processing circuit 310 may perform the functions of a processing circuit discussed above. Processing circuit 310 may include any of the conventional circuits, processors, and devices as discussed above, or combination thereof.

In an implementation, memory 320 may store information including scan queue 322, WiMax CINR to data rate table 324, WiFi signal level to data rate table 326, WiMax scan interval table 328, WiFi scan interval table 330, allowed base station (BS) list 332, active link list 334, scan result list 336, and program code 338.

Program code 338 may include instructions for execution by processing circuit 310 to perform the functions of link manager 130.

Processing circuit 310 cooperates with memory 320 to implement scan queue 322. Scan queue 322 may be implemented using any conventional queuing algorithm. Processing circuit 310 may use scan queue 322 to store and retrieve scan requests. In an implementation, scan queue 322 is implemented as a first-in-first-out queue that stores radio system identification numbers (e.g., RS_ID) of radio systems 210-230 of eTWLU 110 and eTWLU 120 as shown in Table 1 below. In an implementation, an RS_ID for radio system 210 of eTWLU 110 is eTWLU 110 RS_ID 210. The RS_ID of the other radio systems of eTWLU and radio systems 210-230 of eTWLU 120 are similarly formed.

TABLE 1

Scan Queue
Radio System ID eTWLU_110_RS_ID_220
eTWLU_120_RS_ID_230
eTWLU_120_RS_ID_210
eTWLU_110_RS_ID_210
...
eTWLU_ZZ_RS_ID_XX Scan queue 322 may include as many entries as needed for proper operation of a communication system 150. The number of entries in scan queue 322 may be in accordance with scan intervals stored interval timers 350-364. Scan intervals may be in accordance with link quality.

Link manager 130 may use any conventional method for responding to scan requests and/or notices from interval timers 350-364, discussed below, to perform a scan. In an implementation, discussed herein, scan queue 322 tracks scan requests for serial performance by link manager 130. In another implementation, scan queue 322 is eliminated and new scan requests are prohibited (e.g., suppressed) until a present scan is completed. Upon completion of the present scan, link manger 130 enables scan requests and receives a next scan request, if any, for processing. In another implementation, link manager 130 instructs any number of radio systems to perform a scan upon receipt of one or more scan request. Performing a scan upon receive a request may result in one or more radio systems performing a scan at the same time, which may interrupt communications for transferring information between communication system 150 and the base stations at the location; however, is an environment where more frequent scanning is desirable, parallel scanning of radio systems may be accomplished.

In an implementation, link manager 130 may issue a request to a first radio system to perform a scan and not issue a request to any other radio systems to perform a scan until the first radio system finishes scanning. Controlling scanning so that only one radio system performs a scan at any one time reduces interruptions in communication between radio systems that have an established link with a base station. In another implementation, a radio system that presently does not have a communication link with a base station may be instructed to continuously scan, possibly in parallel with scans performed by other radio systems, until instructed by link manager 130 to establish a link with a base station.

WiMax CINR to data rate table 324 includes information for converting a CINR value to an estimated data rate for a WiMax wireless link. As discussed above, a radio system 210-230 may detect the quality of a link between radio system 210-230 and one or more base stations 160-174. Radio system 210-230 may report the link quality, in one implementation CINR, to processing circuit 250 of the respective eTWLU (e.g., 110, 120). Processing circuit 250 may provide the link quality information to processing circuit 310 of link manager 130. Processing circuit 310 may use the information of WiMax CINR to data rate table 324 to convert the link quality information for the WiMax protocol to an estimated data rate of a link.

Processing circuit 310 may use a CINR value as reported by a radio system for determining an estimated data rate. For example, information stored in WiMax CINR to data rate table 324 may include the information provided below in Table 2. Upon receiving a CINR value from a radio system of an eTWLU that uses the WiMax communication protocol, processing circuit 310 may use the value of the CINR to estimate the data rate of a link between the reporting radio system and a specific base station. The value for channel bandwidth may be reported by a base station during a scan or may be a fixed value for a radio system and/or base station.

TABLE 2

WiMax CINR to Data Rate Table

| CINR (qdB) | CINR (dB) | Channel Bandwidth (MHz) | Estimated Data Rate (Mbit/s) |
|---|---|---|---|
| 96 | 24 | 10 | 22.3 |
| 96 | 24 | 7 | 14.5 |
| 96 | 24 | 3.5 | 5.61 |
| 86 | 21.5 | 10 | 19.83 |
| 86 | 21.5 | 7 | 12.89 |
| 86 | 21.5 | 3.5 | 4.99 |
| 72 | 18 | 10 | 14.87 |
| 72 | 18 | 7 | 9.67 |
| 72 | 18 | 3.5 | 3.74 |
| 58 | 14.5 | 10 | 9.91 |
| 58 | 14.5 | 7 | 6.44 |
| 58 | 14.5 | 3.5 | 2.49 |
| 50 | 12.5 | 10 | 7.43 |
| 50 | 12.5 | 7 | 4.83 |
| 50 | 12.5 | 3.5 | 1.86 |
| 40 | 10 | 10 | 4.95 |
| 40 | 10 | 7 | 3.22 |
| 40 | 10 | 3.5 | 1.24 |
| 22 | 5.5 | 10 | 2.47 |
| 22 | 5.5 | 7 | 1.60 |
| 22 | 5.5 | 3.5 | 0.62 |
| Below 22 | Below 5.5 | — | 0 |

For example, assume that processing circuit 310 accesses the next entry in scan queue 322 to determine which radio system should perform a scan. For the sample scan queue provided above in Table 1, the next entry is radio system 220 of eTWLU 110. Processing circuit 310 sends a command to processing circuit 250 of eTWLU 110 for radio system 220 to perform a scan. Assume for this example that radio system 220 of eTWLU 110 communicates using the WiMax wireless communication protocol and that base stations 160-174 also use the WiMax protocol. Radio system 220 performs the scan in accordance with the WiMax wireless protocol. Assume that the wireless protocol enables radio system 220 of eTWLU 110 to determine the CINR and channel bandwidth of signals transmitted from base stations 160-174. After performing the scan, radio system 220 of eTWLU 110 reports the detected CINR and channel bandwidth values for each base station to processing circuit 250 of eTWLU 110 which in turn reports the detected CINR and channel bandwidth values to processing circuit 310 of link manager 130.

Assume that the CINR and channel bandwidth values detected by radio system 220 of eTWLU 110 are (24 dB, 7 MHz); (18 dB, 10 MHz); (12.5 dB, 3.5 MHz); (below 5.5 dB, 3.5 MHz); (14.5 dB, 7 MHz); (10 dB, 10 MHz); (24 dB, 10 MHz); and (5.5 dB, 10 MHz) for base stations 160-174 respectively. Using the detected CINR value and the channel bandwidth as reported by the radio system 220, processing circuit 310 may determine an estimated data rate for a wireless link between radio system 220 of eTWLU 110 and base stations 160-174 respectively. Assume that radio system 220 of eTWLU 110 returns the information provided in Table 3 below.

TABLE 3

Information Reported After Scan

| Base Station | CINR (dB) | Channel Bandwidth (MHz) | Estimated Data Rate (Mbit/s) |
|---|---|---|---|
| 160 | 24 | 7 | 14.5 |
| 162 | 18 | 10 | 14.87 |
| 164 | 12.5 | 3.5 | 1.86 |
| 166 | Below 5.5 | 3.5 | 0 |
| 168 | 14.5 | 7 | 6.44 |
| 170 | 10 | 10 | 4.95 |
| 172 | 24 | 10 | 22.3 |
| 174 | 5.5 | 10 | 2.47 |

Processing circuit 310 uses the information reported by radio system 220 of eTWLU 110 to determine estimated data rates of 14.5, 14.87, 1.86, 0, 6.44, 4.95, 22.3, and 2.47 Mbit/s for potential wireless links between radio system 220 of eTWLU 110 and base stations 160-174 respectively. Processing circuit 310 may store the estimated data rates in scan result list 336 as discussed below.

In an implementation of a WiMax system where the channel bandwidth for each radio system is fixed (e.g., known, preset), the radio system reports only the detected CINR and processing circuit 310 determines a data rate using the information of WiMax CINR to Data Rate Table 324 for the reported CINR and known channel bandwidth.

WiFi received signal level (e.g., RSL) to data rate table 326 includes information for converting a received signal level value from a radio system that uses the WiFi wireless protocol to an estimated data rate for a potential WiFI wireless link. As discussed above, a radio system 210-230 may detect the quality of a link between radio system 210-230 and one or more base stations 160-174.

Radio system 210-230 may report the link quality, in one implementation received signal level, to processing circuit 250 of the respective eTWLU (e.g., 110, 120). Processing circuit 250 may provide the link quality information to processing circuit 310 of link manager 130. Processing circuit 310 may use the information of WiFi received signal level to data rate table 326 to estimate the data rate of a potential link.

For example, information stored in WiFi received signal level to data rate table 326 may include the information provided below in Table 4. Upon receiving a received signal level value from a radio system of an eTWLU that uses the WiFi wireless protocol, processing circuit 310 may use the value of the received signal level to estimate the data rate of a link between the reporting radio system and a specific base station.

TABLE 4

WiFi RSL to Data Rate Table

| RSL (dB) (greater than) | Estimated Data Rate (Mbit/s) |
|---|---|
| −77 | 32 |
| −84 | 17.5 |
| −87 | 10 |
| −88 | 5 |
| −90 | 1 |
| −91 | 0.5 |
| Below −91 | 0 |

Continuing the example above, assume that the next entry in scan queue 322 is radio system 230 of eTWLU 120. Processing circuit 310 sends a command to processing circuit 250 of eTWLU 120 for radio system 230 to perform a scan. Assume for this example that radio system 232 of eTWLU 120 and base stations 160-174 communicate using the WiFi wireless protocol. Radio system 230 performs scan (e.g., active, passive) in accordance with the WiFi communication protocol.

Assume that the WiFi wireless protocol enables radio system 230 of eTWLU 120 to determine a signal level transmitted from base stations 160-174. After radio system 230 of eTWLU 120 detects a signal from each base station 160-174, radio system 230 reports the detected received signal level values for each base station to processing circuit 250 of eTWLU 120. Processing circuit 250 reports the detected received signal levels to processing circuit 310 of link manager 130.

Assume that the received signal level values detected by radio system 230 of eTWLU 120 are −76, −86, −89, −95, −78, −71, −80, and −83 dB for base stations 160-174 respectively. Using the detected received signal level value as reported by the radio system 230, processing circuit 310 may determine an estimated data rate for a potential wireless link between radio system 230 of eTWLU 120 and base stations 160-174 respectively. In this example, processing circuit 310 uses the link quality information reported by radio system 230 of eTWLU 120 to determine estimated data rates of 32, 10, 1, 0, 17.5, 32, 17.5, and 17.5 Mbit/s for potential wireless links between radio system 230 and base stations 160-174 respectively.

The received signal level values detected by a radio system may be averaged or altered prior to determining an estimated data rate. Averaging received signal levels may be performed using any conventional averaging algorithm. In an implementation, the exponential weighted average formula discussed above and provided in Equation 1 is used to average the received signal level for use with WiFi signal level to data rate table 326 to find an estimated data rate.

Base stations that provide wireless service to a location may communicate using one or more wireless protocols. Base stations that use the WiMax protocol may report a CINR value as a result of performing a scan (e.g., scan result) as discussed above. Base stations that use the WiFi protocol may report a received signal level value as discussed above. A radio system that communicates using a particular wireless protocol may scan and provide a scan result for only those base stations that communicate using the same protocol.

For example, assume that radio system 220 of eTWLU 110, radio systems 210 and 220 of eTWLU 120, and base stations 160, 162, 168, and 170 use the WiMax protocol for communication. Further assume that radio systems 210 and 230 of eTWLU 110, radio system 230 of eTWLU 120, and base stations 164, 166, 172, and 174 use the WiFi protocol. Radio systems that use the WiMax communication protocol cannot scan base stations that use the WiFi communication protocol and visa versa. Radio system 220 of eTWLU 110 and radio systems 210 and 220 of eTWLU 120 will report scan results for base stations 160, 162, 168, and 170, but not for base stations 164, 166, 172, and 174. Radio systems 210 and 230 of eTWLU 110 and radio system 230 of eTWLU 120 will report scan results for base stations 164, 166, 172, and 174, but not for base states 160, 162, 168, and 170.

WiMax scan interval table 328 and WiFi scan interval table 330 include information for determining a frequency for scanning. Link manager 130 may control the frequency of scanning for each radio system of eTWLU 110 and eTWLU 120. A frequency of scanning may be in accordance with a quality of the link between a radio system and a base station. For example, information stored in WiMax scan interval table 328 and WiFi scan interval table 330, provided in Tables 5 and 6 respectively, may be used by used by link manager 130 to determine a scan interval for a radio system.

TABLE 5

WiMax Scan Interval Table

| EMA of CINR (dB) | Scanning Interval (seconds) |
|---|---|
| 25 | 0 |
| 20 | 1000 |
| 10 | 200 |
| 1 | 100 |

TABLE 6

WiFi San Interval Table

| EMA of RSL (dB) (greater than) | Scanning Interval (seconds) |
|---|---|
| −75 | 0 |
| −85 | 400 |
| −90 | 200 |
| −94 | 100 |

Link manager 130 may use an average value of the CINR value and/or RSL value for determining a scan interval. Any conventional formula may be used to calculate an average value of a CINR value and/or a RSL value. In an implementation, processing circuit 310 uses an exponential moving average of a CINR value and/or RSL value for determining a scan interval. Any conventional exponential moving average formula may be use. In an implementation, the formula for calculating an exponential moving average ("EMA") of a CINR value is expressed as Equation 1, provided below. Equation 1 may be used to calculate an exponential moving average of RSL. In an implementation, the value for a weight, variable w below, may be in the range of 0.1-0.2.

$$EMA(t)=CINR(t)*w+EMA(t-1)*(w-1) \quad \text{Equation 1}$$

Scanning frequency may be inversely related to link quality. For example, in an implementation that uses the information of the above scan interval tables, a radio system that communicates with a base station via a wireless link of high quality (e.g., WiMax: >25 dB, WiFi: >−75 dB) is not scanned at an interval (e.g., scanning interval=0). Scanning may interfere with communication at least communication by the radio system performing the scan, so communication via a link of high quality is not interrupted. A radio system that communicates with a base station via a wireless link of lesser quality (e.g., WiMax <=20 dB, WiFi <=−85 dB) may be instructed to scan more frequently. For example, as the quality of the link decreases, the interval at which scanning is performed decreases such that the frequency of scanning increases.

Link manager 130 may set a scan interval for each radio system 210-230 of eTWLU 110 and eTWLU 120. Interval timer 350-364 may be used to track (e.g., time, count down, monitor) an interval for each radio system. An interval timer may be associated (e.g., correspond to) a single radio system. For example, each interval timer 350 through 364 corresponds to one radio system 210-230 of eTWLU 110 and eTWLU 120.

An interval timer may detect an expiration of an interval. An interval timer may provide notice to processing circuit 310 regarding expiration of an interval. Upon receiving notice of expiration of an interval, processing circuit 310 may instruct a radio system to perform a scan. Processing circuit 310 may instruct an interval timer to monitor expiration of a new interval. A new interval may be the same or different from a previous interval. Processing circuit 310 may instruct an interval timer to monitor a new interval at any time after expiration of a present interval. A new interval may be in accordance with signal quality information. Signal quality information received from a radio system that performs a scan may be used to set a new interval for the interval timer associated with that radio system. An interval timer may be set in accordance with the link quality information for the link established between the radio system that performed the scan and the link established with a base station after scanning.

Each interval timer 350-364 counts time until expiration of an interval for its respective radio system. Any conventional circuit or combination of circuits and software may be used to implement interval timers 350-364. Upon expiration of an interval, the interval timer provides a notice to processing circuit 310 of the expiration. Processing circuit 310 determines the identity of the radio system associated with the interval timer that provided the notice.

If a radio system is presently performing a scan and an interval timer provides notice of expiration of an interval, processing circuit 310 records the radio system identification number (e.g., RS_ID) in scan queue 322, so that the radio system whose timer expired may be scanned in turn when the present scan completes. Operation of the scan queue and permitting only a single radio system to perform a scan at a time is discussed above. However, there is no limitation that only one radio system may scan at a time. Multiple radio systems may scan at the same time.

If no radio system is presently performing a scan, processing circuit 310 instructs the radio system that corresponds to the notifying interval timer to perform a scan. Upon completion of the scan, processing circuit 310 may instruct the radio controller to establish a link with a base station. Processing circuit 310 sets the interval timer for the radio system in accordance with the quality of the wireless link established between the radio system and the base station as reported after scanning.

For example, in an implementation, interval timers 350, 352, and 354 correspond to radio systems 210, 220, and 230 of eTWLU 110 respectively. Interval timers 360, 362, and 364 correspond to radio systems 210, 220, and 230 of eTWLU 120 respectively. Suppose that radio system 210 of eTWLU 110 communicates with base station 160 using the WiMax protocol and that the link has an EMA of the CINR of 20 dB. Further suppose that radio system 210 of eTWLU 120 communicates with base station 162 using the WiFi protocol and that the link has a RSL of −94 dB. Processing circuit 310 sets interval timer 350 to count a 1000-second interval and interval timer 360 to count a 100-second interval. After 100 seconds, interval timer 360 interval timer interrupts processing circuit 310 to provide notice that radio system 210 of eTWLU 120 should perform a scan. Because there are no other scans in progress, processing circuit instructs radio system 210 of eTWLU 120 to perform a scan. Assume that after each scan the quality of the established link is always −94 dB. Processing circuit 310 reloads interval timer with a 100-second interval and restarts counting of the interval.

After radio system 210 of eTWLU 120 has performed approximately ten scans, interval timer 360 expires. Interval timers 350 and 360 may expire at about the same time. When processing circuit 310 receives interval expiration notices from two or more interval timers at about the same time or while a scan is in progress, the identities of the radio systems that corresponds to the timers are placed on scan queue 322 and the corresponding interval timer is not updated until after the respective radio system performs the scan. In this example, processing circuit 310 receives the notice from interval timer 350 before the notice from interval timer 360, so processing circuit 310 instructs radio controller 210 of eTWLU 110 to perform a scan and places the radio controller identification number (e.g., RS_ID) of radio controller 210 of eTWLU 120 on scan queue 322 for later processing as discussed above.

After a scan is performed, an interval timer may be set to a value that corresponds to the quality of the link the radio system establishes with a base station. If the scan results show that no base station provides a link of suitable quality, processing circuit 310 of link manager 130 may set the radio system into a continuous scan mode. A radio system that cannot establish a link with a base station may continuously scan when scanning does not interrupt the communication links established by other radio systems. A radio system that continuously scans may send scan results periodically to link manager 130. When a link with a base station of suitable quality is found, link manager 130 may instruct the radio system to establish a communication link with that base station. Processing circuit 310 may then set the interval timer that corresponds to the radio system to a value that corresponds to a quality of the link.

If the scan results show that a base station may provide a link of suitable quality, link manager 130 instructs the radio system to establish a link with the base station. Link manager 130 further sets the interval timer associated with that radio system to a value that corresponds to the quality of the link (e.g., CINR, RSL) established between the radio system and the base station.

Calculation of data rate and scan interval using link quality information is not limited to the WiMax and/or WiFi communication algorithms. Data rate tables (e.g., 324, 326) and/or scan interval tables (e.g., 328, 330) may be determined for any conventional protocol. The systems and methods described herein may be used for any conventional wireless communication protocol.

A communication system onboard a vehicle may be transported to a location serviced by base stations that are not authorized to communicate with the communication system. A communication system may include information for identifying allowed (e.g., secured, authorized) base stations or disallowed (e.g., unsecured, unauthorized) base stations. A link manager may determine whether a radio system may establish a link with a particular base station. If an available base station is not authorized, the link manager may restrict (e.g., prohibit) a radio system from connecting with the base station. A base station and/or a network associated with a base station may be prohibited from establishing a link with a particular communication system.

In an implementation, allowed BS list 332 stores identification information (e.g., base station identification number, MAC address, ID number, ID information) of base stations to which the radio systems 210-230 of eTWLU 110 and eTWLU 120 may establish a communication link. A sample allowed base station list 332 is provided in Table 7 below.

TABLE 7

| Allowed Base Station List | |
|---|---|
| BS ID | Geographic Location (optional) |
| BS_ID_01 | Location_01 |
| BS_ID_02 | Location_02 |
| BS_ID_03 | Location_03 |
| BS_ID_04 | Location_04 |
| ... | ... |
| BS_ID_Y | Location_Z |

Information detected during scanning may include the identification number of each base station available at a location. Processor 310 may compare the base station ID information to the ID information stored in allowed base station list 332 to determine whether to permit or prohibit a link between a radio system and a particular base station.

Allowed base station list 332 may optionally include a coordinates of the geographic location of each allowed base station. A link manager capable of determining its geographic location may compare its present geographic location to the stored geographic location for each detected base station. If the present geographic location for a particular base station is not within a limit of the stored geographic location for that particular base station ID, the link manager may prohibit a connection with that base station.

Link manager 130 may maintain a list of base stations that are presently linked (e.g., active link, communicating) to any radio system of communication system 150. An active link list may include an identification number for each radio system and the identification number of the base station to which the radio system is presently linked.

In an implementation, active link list 334 may include an entry for each radio system 210-230 of eTWLU 110 and eTWLU 120 and the BS identification number of the base station to which the radio system is linked if a link has been established. A sample active link list table is provided in Table 8.

TABLE 8

Active Link List

| Link ID | BS ID |
|---|---|
| eTWLU_110_RS_ID_210 | BS_160 |
| eTWLU_110_RS_ID_220 | BS_170 |
| eTWLU_110_RS_ID_230 | BS_166 |
| eTWLU_120_RS_ID_210 | BS_162 |
| eTWLU_120_RS_ID_220 | No link |
| eTWLU_120_RS_ID_230 | BS_164 |

As link manager 130 establishes and changes links between radio systems 210-230 of eTWLU 110 and eTWLU 120 and base stations, processing circuit 310 updates the entries of active link list 334.

As link manager 130 instructs radio systems to perform scans and receives scan results, link manager 130 may store the link quality information provided by the radio systems in scan result list 336. Scan result list 336 may record the link quality information for a wireless link between each radio system and each base station. Scan result list 336 shown in Table 9 below includes entries for each radio system 210-230 of eTWLU 110 and eTWLU 120 and each base station for the location where the vehicle is located. Because the number of base stations may vary by location, the number of base stations listed for each radio system in scan result list 336 may vary by location.

TABLE 9

Scan Result List

| Radio System ID | BS ID | Link Quality Information | Estimated Data Rate (Mbit/s) |
|---|---|---|---|
| eTWLU_110_RS_ID_210 | BS_ID_01 | | |
| | BS_ID_02 | | |
| | ... | | |
| | BS_ID_Y | | |
| eTWLU_110_RS_ID_220 | BS_ID_01 | | |
| | BS_ID_02 | | |
| | ... | | |
| | BS_ID_Y | | |
| eTWLU_110_RS_ID_230 | BS_ID_01 | | |
| | BS_ID_02 | | |
| | ... | | |
| | BS_ID_Y | | |
| eTWLU_120_RS_ID_210 | BS_ID_01 | | |
| | BS_ID_02 | | |
| | ... | | |
| | BS_ID_Y | | |
| eTWLU_120_RS_ID_220 | BS_ID_01 | | |
| | BS_ID_02 | | |
| | ... | | |
| | BS_ID_Y | | |
| eTWLU_120_RS_ID_230 | BS_ID_01 | | |
| | BS_ID_02 | | |
| | ... | | |
| | BS_ID_Y | | |

Radio systems that employ a particular wireless protocol may communicate only with base stations that use the same wireless protocol, so the number of base station entries for each radio system may further depend on the number of base stations that use the same protocol as the radio system. The wireless protocol further determines the scan result information provided by the radio system after performing the scan. For example, as discussed above, a radio system that uses the WiMax wireless protocol reports CINR and possibly channel bandwidth whereas a radio system that uses the WiFi wireless protocol reports the RSL.

Link manager 130 uses the link quality information provided by each radio system to calculate an estimated data rate for a potential wireless link between each radio system and each base station. Link manager 130 may calculate the estimated data rate as discussed above. Link manager 130 stores the estimated data rate as an entry in scan result list 336 for each radio system and each base station. After each radio system has performed a scan, scan result list 336 stores an estimated data rate for each possible wireless link between all radio system and any base station.

In an implementation, assume that radio systems 210 and 220 of eTWLU 110 and eTWLU 120 use the WiMax wireless protocol and radio systems 230 of eTWLU 110 and eTWLU 120 use the WiFi wireless protocol. Further, assume that base stations 160, 162, 168, and 170 use the WiMax wireless protocol and base stations 164, 166, 172, and 174 use the WiFi wireless protocol. The entries for scan result list 336 for such an implementation are shown in Table 10.

TABLE 10

Scan Result List Implementation

| Radio System ID | BS ID | Link Quality Information | | Estimated Data Rate (Mbit/s) |
|---|---|---|---|---|
| | | CINR | Bandwidth | |
| eTWLU_110_RS_ID_210 | BS_160 | | | |
| | BS_162 | | | |
| | BS_168 | | | |
| | BS_170 | | | |
| eTWLU_110_RS_ID_220 | BS_160 | | | |
| | BS_162 | | | |
| | BS_168 | | | |
| | BS_170 | | | |

| Radio System ID | BS ID | RSL | Estimated Data Rate (Mbit/s) |
|---|---|---|---|
| eTWLU_110_RS_ID_230 | BS_164 | | |
| | BS_166 | | |
| | BS_172 | | |
| | BS_174 | | |

| Radio System ID | BS ID | CINR | Bandwidth | Estimated Data Rate (Mbit/s) |
|---|---|---|---|---|
| eTWLU_120_RS_ID_210 | BS_160 | | | |
| | BS_162 | | | |
| | BS_168 | | | |
| | BS_170 | | | |
| eTWLU_120_RS_ID_220 | BS_160 | | | |
| | BS_162 | | | |
| | BS_168 | | | |
| | BS_170 | | | |

| Radio System ID | BS ID | RSL | Estimated Data Rate (Mbit/s) |
|---|---|---|---|
| eTWLU_120_RS_ID_230 | BS_164 | | |
| | BS_166 | | |
| | BS_172 | | |
| | BS_174 | | |

As each radio system performs a scan and returns link quality information to link manager 130, the link quality entries of scan result list 336 are set to the values received from the radio systems. Link manager 130, or processing circuit 310 of link manager 130, uses the link quality information and data rate tables 324 and 326, as discussed above, to calculate an estimated data rate for each potential wireless link between each radio system and each base station. After all radios systems have performed one scan, all entries of scan result list 336 have a value. Link manager 130 updates the entries of scan result list 130 as radio systems perform additional scanning as determined by interval tables 328 and 330 as discussed above. Link quality information from scan result list 336 is used to determine the intervals for scanning. Accordingly, scan result list 336 provides link manager 130 with information as to the data rate of all possible wireless links between the radio systems and the base stations.

Link manager 130 may use the data rate information to establish one or more links to provide a desired overall data rate between communication system 150 and the networks coupled to base stations 160-174.

In another implementation, the link quality information may be considered temporary data and discarded by link manager 130 after calculating and storing the estimated data rate in scan result list 336 and determining a proper scan interval. Entries for link quality information may be omitted from scan result list 336 in such an implementation.

As link manager establishes links between radio systems and base stations, link manager 130 records the established links in active link list 334. As link manager 130 discontinues or establishes new links, link manager 130 updates the information in active link list 334. Link manager 130 may use the information from allowed BS list 332 determine whether a link should be established between a radio system and a base station.

The functions of link manager 130 and the cooperation of link manager 130 with eTWLU 110 and eTWLU 120, as discussed above, may be implemented as methods 400 and 500. For example, methods 400 and 500 of FIGS. 4-6 may be performed by processing circuit 310 of link manager 130. Methods 400 and 500 may be performed in a multitasking operating system environment where each process performs wherever sufficient input data is available. In other implementations, processes may be performed in a sequence similar to the sequence described below. Multiple apparatus may be operated from one method if performed in an operating system environment that supports multithreaded execution (e.g., one thread, context, or partition for each apparatus). Inter-process communication may be accomplished in any conventional manner (e.g., subroutine calls, pointers, stacks, common data areas, messages, interrupts). As desired, any of the processes of methods 400 and 500 may be implemented in circuit of functional blocks other than link manager 130. An eTWLU may cooperate to perform a process or a portion of a process of methods 400 or 500.

Method 400 includes start process 402, check scan queue process 404, get queue RS_ID process 406, check interval notice process 408, get interval RS_ID process 410, scan command process 412, scan result process 414, data rate process 416, set interval process 418, update process 420, set links process 422, pause process 424, and end process 426.

Process 400 may be executed as needed, at a regular interval, upon receipt of a start signal (e.g., interval timer notice, not empty notice from scan queue 322) and/or continuously where control passes from end 426 to start 402 to continuously loop.

Start process 402 may create variables or temporary storage space for use by the processes of method 400.

End process 426 may free variables or temporary storage space for use by the processes of method 400 and provide a return indication to a calling process.

Upon start of method 400, check scan queue process 404 determines whether scan queue 322 is empty or whether scan queue 322 contains at least one radio system identification number ("RS_ID").

If scan queue 322 contains at least one RS_ID, control passes from check scan queue process 404 to get queue RS_ID process 406. Get queue RS_ID process 406 gets the next available RS_ID from scan queue 322. Get queue RS_ID process 406 identifies the retrieved RS_ID as Scan RS_ID, which is the identification number of the radio system of one of the eTWLUs that will be instructed to perform a scan.

If scan queue 322 does not contain any entries, control passes from check scan queue process 404 to check interval notice process 408. Check interval notice process 408 determines whether an interval timer of interval timers 350-364 has provided a notice of expiration. Check interval notice process 408 detects expiration notices from interval timers 350-364 prior to transfer of the notice and the RS_ID associated with the interval timer to scan queue 322. If check interval notice process 408 detects a notice, check interval notice process 408 identifies the RS_ID associated with the interval timer as Scan RS_ID. If more than one interval timer provides notice, the notices of the other timers are placed in scan queue 322 for later processing.

Control passes from get queue RS_ID process 406 or get interval RS_ID process 410 to scan command process 412. Scan command process 412 instructs the radio system identified as Scan RS_ID to perform a scan. As discussed above, link manager 130 may instruct the eTWLU that has the radio system identified for scanning to instruct the radio system to perform the scan. The process of link manager 130 providing a command to an eTWLU may include verification of receipt of the instruction. After issuing the scan command to the appropriate eTWLU, control passes from scan command process 412 to scan result process 414.

Scan result process 414 waits to receive a scan result from the radio system that was instructed to perform a scan. Upon receipt of the scan information from the scanned radio system, control passes to data rate process 416.

Data rate process 416 uses the scan information (e.g., link quality information) provided by the scanned radio system to determine estimated data rates for possible links with the base stations scanned by the radio system. As discussed above, WiMax CINR to data rate table 324 or WiFi signal level to data rate table 326 are used to calculate the data rates. As discussed above, the number of possible links depends upon the number of base stations at the location, the wireless protocol used by the scanning radio system, and the wireless protocol used by the base stations at the location. As further discussed above, the number of possible links may further depend on whether communication system 150 is allowed to establish a link with a particular base station (e.g., allowed BS list 332).

Update process 420 updates scan result list 336 with link quality and data rate information for the scanned radio system.

Set links process 422 uses the information from the scan result list to determine whether the presently active links established by the radio systems with base stations of the location meet the needs of communication system 150. The needs of communication system 150 may include security, cost, and/or throughput. In the case of security, link manager 130 may determine whether links are established only with the allowed base stations specified in allowed BS list 332. Security needs may further include encryption key management, types of encryption algorithms, and information communicate for the present security environment. In the case of cost, the cost of establishing and using a link with each base station of a location may be stored in scan result list 336. Link manager may determine whether the cost of the active links meet the cost criteria set by the owner or user of the vehicle.

In the case of throughput, link manager 130 determines whether the established links provide a combined data rate above a threshold.

In an implementation, link manager 130 establishes links to select the highest available combined data rate. A combined data rate is the sum of all the data rates of the individual radio systems. Link manager 130 uses the information provided in scan results list 336 to find available base stations that provide the highest available data rate and establishes links with those base stations. An implementation of set links process 422 includes method 500. Set links process 422 may execute method 500 in any conventional manner (e.g., subroutine, process call).

After the links between radio systems and base stations have been established, link quality information and information as to active links (e.g., active link list 334) are used by set interval process 418 to set the time of the next scan of the scanned radio system. The scan interval may further be changed for any radio system whose link has been changed. As discussed above, the link quality information for established links is used with WiMax scan interval table 328 or WiFi scan interval table 330 to determine the interval for the next scan. Set interval process 418 calculates the interval and loads the interval value in the interval timer that corresponds to the radio system as discussed above.

Pause process 424 executes a wait sufficient to allow the links established by set links process 422 to become operational.

Method 500 includes start process 510, set RSc process 512, set BSc process 514, set BShd process 516, compare process 518, check link process 520, link process 522, set RSo process 524, set BSat process 610, sum proposed process 612, sum present process 614, compare process 616, link process 618, retain process 620, and end process 542.

Start process 510 may create variables or temporary storage space for use by the processes of method 500.

End process 542 may free variables or temporary storage space for use by the processes of method 500 and provide a return indication to a calling process.

Set RSc process 512 sets a variable RSc to the radio system identification number, RS_ID, of the radio system that was instructed to perform a scan by scan command process 412 and that returned scan results to scan result process 414. The variable RSc represents the current radio system whose scan results are being examined.

Set BSc process 514 sets a variable BSc to the base station identification number, BS_ID, of the base station to which radio system RSc was linked prior to performing the scan or remains linked during and/or after the scan. The active link between RSc and BSc is recorded in active link list 334.

Set BShd process 516 sets a variable BShd to the base station identification number, BS_ID, of the base station that has the highest estimated data rate for a link between radio system RSc and any base station that may establish a link with radio system RSc. Scan result list 336 provides the estimated data rates for possible links between radio system RSc and the base stations that are capable of establishing a link with radio system RSc. The variable BShd represents the base station that may provide the highest data rate link with radio system RSc. In the event that multiple base stations may provide the highest data rate link with radio system RSc, one base station may be selected as BShd using any criteria (e.g., cost, security, first listed, random selection).

Compare process 518 compares the data rate of a proposed link between RSc and BShd with the data rate of the present link between RSc and BSc. If the data rate of the proposed link is less than the data rate of the present link, then compare process 518 passes control to end process 542. If the data rate of the proposed link between RSc and BShd is higher than the data rate of the present link between RSc and BSc, then control passes to check link process 520.

Check link 520 determines whether BShd is presented linked to a radio system other than RSc. Active link list 334 records the active links between the radios systems of communication system 150 and the base stations where the vehicle is located. If BShd is not linked to a radio system, then control passes to link process 522. If BShd is connected to another base station, then control passes to set RSo process 524.

Link process 522 establishes a link between RSc and BShd. Establishing a link may be accomplished by link manager 130 sending command to the eTWLU that includes radio system RSc. Processing circuit 250 of the eTWLU may manage the process of terminating (e.g., disengaging, disassociating) the link between RSc and BSc and establishing a link between RSc and BShd. Processing circuit 250 may confirm execution of the command to link manager 130. Link manager 130 may update active link list 334 with the newly established link. Link process 522 represents establishing a link between radio system RSc and the base station that provides a link have the highest available data rate for radio system RSc. The amount of increased data rate provided by establishing a link between RSc and BShd as opposed to retaining the link between RSc and BSc represents an increase in the total (e.g., combined) data rate provided by all active links of communication system 150.

Set Rso process 524 sets the variable RSo to the radio system identification number, RS_ID, of the radio system presently linked to BShd. Active link list 334 provides the RS_ID of the radio system presently linked to BShd.

Set BSat process 610 sets a variable BSat to the base station identification number, BS_ID, of a base station that is not presently linked to a radio system and that provides the highest data rate. Set BSat process 610 uses the information stored in scan result list 336 and active link list 334 to find an unused (e.g., no active link) base station that is capable of establishing a link with the radio system that is presently linked to BShd. BSat represents an available base station to which RSo may be linked, so that RSc may be linked to BShd.

Sum proposed process 612 determines the sum of the data rate between radio system RSo and base station BSat and the data rate between radio system RSc and base station BShd. The sum of these data rates represents the combined data rate if radio system RSo establishes a link with base station BSat and radio system RSc establishes a link with base station BShd. Presently radio systems RSc and RSo do not communicate with base stations BSat or BShd. Scan result list 336 provides the estimated data rates for the proposed communication link between RSc and BShd and the proposed communication link RSo and BSat.

Sum present process 614 determines the sum of the data rate between radio system RSc and base station BSc and the data rate between radio system RSo and base station BShd. Radio system RSc presently communicates with base station BSc via a wireless link. Radio system RSo presently communicates with base station BShd via a wireless link. The links are recorded in active link list 334. The sum of the data rates represents the combined data rate of the presently established communication links between RSc, RSo and BSc, BShd. Scan result list 336 provides the estimated data rates for the present communication links. Actual (e.g., measured, detected) data rates may be further provided by the radio systems RSc and RSo.

Compare process 616 compares the sum of the data rates of the proposed wireless links to the sum of the data rates of the present wireless links. If the sum of the proposed data rates is greater than the sum of the present data rates, control passes to link process 618. If the sum of the proposed data rates is less than or equal to the sum of the present data rates, control passes to retain process 620. Compare process 616 determines which combination of radio systems and base stations provide the highest available data rate for the combined data rates of the radio systems and base stations.

Link process 618 terminates the active wireless link between radio system RSc and base station BSc and the active wireless link between radio system RSo and BShd. Link process 618 establishes a wireless link between radio system RSo and base station BSat. Link process 618 further establishes a wireless link between radio system RSc and base station BShd. Establishing the proposed wireless links as discussed above provides a higher combined data rate between the base stations at the location and communication system 150 than was provided by the present wireless links.

Retain process 620 retains active the link between radio system RSc and base station BSc and the link between radio system RSo and base station BShd. Retaining the links active provides the highest presently available combined data rate between the base stations at the location and communication system 150.

End process 542 returns control to set links process 420 of method 400. Link process 522, link process 618, and retain process 620 may provide a return value to set links 422 via end process 542 so that method 400 may determine the action taken by method 500.

Method 500 may be include exceptions for instances when the number of base stations at a location do not provide sufficient possible connections to fully implement each process of method 500. When the number of radio systems is greater than the number of available base stations, including for a specific wireless protocol, exceptions may include linking to all available base stations that provide a data rate above a threshold.

In the example below that shows how method 500 operates in an implementation, assume, as discussed above, that radio systems 210 and 220 of eTWLU 110 and eTWLU 120 use the WiMax wireless protocol; radio systems 230 of eTWLU 110 and eTWLU 120 use the WiFI wireless protocol; base stations 160, 162, 166, 168, 170, and 172 use the WiMax wireless protocol; and base stations 164 and 174 use the WiFi wireless protocol. Assume that all radio system have performed at least one scan and scan result list 336 contains the results for the previously executed scans as shown in Table 11. Further, assume that radio system 210 of eTWLU 110 just finished a scan, that the scan result list 336 has been updated as shown in Table 11, and the execution of set RSc process 512 has just begun.

TABLE 11

Scan Result List Example

| Radio System ID | BS ID | Link Quality Information | | Estimated Data Rate (Mbit/s) |
|---|---|---|---|---|
| | | CINR | Bandwidth | |
| eTWLU_110_RS_ID_210 | BS_160 | 14.5 | 3.5 | 2.49 |
| | BS_162 | 18 | 10 | 14.87 |
| | BS_166 | 18 | 7 | 9.67 |
| | BS_168 | 21.5 | 10 | 19.83 |
| | BS_170 | 24 | 10 | 22.3 |
| | BS_172 | 24 | 7 | 14.5 |
| eTWLU_110_RS_ID_220 | BS_160 | 21.5 | 3.5 | 4.99 |
| | BS_162 | 24 | 3.5 | 5.61 |
| | BS_166 | 24 | 7 | 14.5 |
| | BS_168 | 24 | 7 | 14.5 |
| | BS_170 | 24 | 10 | 22.3 |
| | BS_172 | 21.5 | 10 | 19.83 |

| Radio System ID | BS ID | RSL (greater than) | Estimated Data Rate (Mbit/s) |
|---|---|---|---|
| eTWLU_110_RS_ID_230 | BS_164 | −84 | 17.5 |
| | BS_174 | −77 | 32 |

| Radio System ID | BS ID | CINR | Bandwidth | Estimated Data Rate (Mbit/s) |
|---|---|---|---|---|
| eTWLU_120_RS_ID_210 | BS_160 | 10 | 10 | 4.95 |
| | BS_162 | 14.5 | 7 | 6.44 |
| | BS_166 | 21.5 | 7 | 12.89 |
| | BS_168 | 5.5 | 7 | 1.60 |
| | BS_170 | 14.5 | 3.5 | 2.49 |
| | BS_172 | 24 | 7 | 14.5 |
| eTWLU_120_RS_ID_220 | BS_160 | 18 | 10 | 14.87 |
| | BS_162 | 21.5 | 3.5 | 4.99 |
| | BS_166 | 21.5 | 10 | 19.83 |
| | BS_168 | 21.5 | 10 | 19.83 |
| | BS_170 | 24 | 7 | 14.5 |

| Radio System ID | BS ID | Link Quality Information | Estimated Data Rate (Mbit/s) |
|---|---|---|---|
| | BS_172 | 18 | 10 | 14.87 |

| Radio System ID | BS ID | RSL (greater than) | Estimated Data Rate (Mbit/s) |
|---|---|---|---|
| eTWLU_120_RS_ID_230 | BS_164 | −88 | 5 |
| | BS_174 | −88 | 5 |

Further assume that the presently active links in active link list 334 are as show Table 12 below.

TABLE 12

Active Link List Example

| Link ID | BS ID |
|---|---|
| eTWLU_110_RS_ID_210 | BS_160 |
| eTWLU_110_RS_ID_220 | BS_170 |
| eTWLU_110_RS_ID_230 | BS_174 |
| eTWLU_120_RS_ID_210 | BS_162 |
| eTWLU_120_RS_ID_220 | BS_168 |
| eTWLU_120_RS_ID_230 | BS_164 |

Table 13 below provides temporary storage for values of temporary variables used as method 500 is executed. Method 500 may use any conventional method for tracking values of temporary variables.

TABLE 13

Temporary Variables Example

| Variable | Value | Note |
|---|---|---|
| RSc | Null | |
| BSc | Null | |
| BShd | Null | |
| Data rate RSc - BSc | Null | Data rate between RSc and BSc |
| Data rate RSc - BShd | Null | Data rate between RSc and BShd |
| BShd linked to? | Null | |
| RSo | Null | |
| Data rate RSo - BShd | Null | Data rate between RSo and BShd |
| BSat | Null | |
| Data rate RSo - BSat | Null | Data rate between RSo and BSat |
| DR1 | Null | Combined data rate of proposed links |
| DR2 | Null | Combined data rate of present links |

Radio system 210 of eTWLU 110 just finished a scan, so set RSc process 512 sets the variable RSc to the RS_ID, eTWLU 110 RS_ID 210, for radio system 210 of eTWLU 110. Set BSc process 514 accesses active link list 334 to determine that radio system 210 of eTWLU 110 presently has a communication link established with base station 160. Set BShd process 516 access the information of scan result list 336 to look for the WiMax base station that offers the highest estimated data rate for a link with radio system 210 of eTWLU 110 (RSc). Table 11 provides the information that base station 170 (e.g., BS_170) offers the highest estimated data rate between radio system 210 of eTWLU 110 and any WiMax base station. Accordingly, set BShd process 516 sets the variable BShd to BS_170. Prior to starting execution of compare process 518, the temporary variables of Table 13 have the values shown below.

TABLE 13

Temporary Variables Example

| Variable | Value | Note |
|---|---|---|
| RSc | eTWLU_110_RS_ID_210 | |
| BSc | BS_160 | |
| BShd | BS_170 | |
| Data rate RSc - BSc | 2.49 Mbit/s | Data rate between RSc and BSc |
| Data rate RSc - BShd | 22.3 Mbit/s | Data rate between RSc and BShd |
| Variable | Value | Note |
| BShd linked to? | Null | |
| RSo | Null | |
| Data rate RSo - BShd | Null | Data rate between RSo and BShd |
| BSat | Null | |
| Data rate RSo - BSat | Null | Data rate between RSo and BSat |
| DR1 | Null | Combined data rate of proposed links |
| DR2 | Null | Combined data rate of present links |

Compare process 518 compares the data rate between Rsc and BShd with the data rate between RSc and BSc (e.g., BS_160) to determine if the data rate of the presently active link is less than the data rate of a potential link between Bsc and Bshd (e.g., BS_170). In this example, the present data rate of 2.49 Mbit/s between radio system 210 of eTWLU 110 and base station 160 is less than the potential data rate of 22.3 Mbit/s between radio system 210 of eTWLU 110 and base station 170, so control passes to check link process 520.

Check link process 520 uses active link list 334 to determine that Bshd (e.g., BS_170) presently has an active link with radio system 220 of eTWLU 110, so set RSo process 524 sets the temporary variable Rso to the RS_ID of radio system 220 of eTWLU 110. Set RSo process 524 may also record the data rate between radio system RSo and base station BShd in a temporary variable or that information may be accessed from scan result list 336 when needed. Prior to starting execution of set BShd process 610, the temporary variables of Table 13 have the values shown below.

TABLE 13

Temporary Variables Example

| Variable | Value | Note |
|---|---|---|
| RSc | eTWLU_110_RS_ID_210 | |
| BSc | BS_160 | |
| BShd | BS_170 | |
| Data rate RSc - BSc | 2.49 Mbit/s | Data rate between RSc and BSc |
| Data rate RSc - BShd | 22.3 Mbit/s | Data rate between RSc and BShd |
| BShd linked to? | eTWLU_110_RS_ID_220 | |
| RSo | eTWLU_110_RS_ID_220 | |
| Data rate RSo - BShd | 22.3 Mbit/s | Data rate between RSo and BShd |
| BSat | Null | |
| Data rate RSo - BSat | Null | Data rate between RSo and BSat |
| DR1 | Null | Combined data rate of proposed links |
| DR2 | Null | Combined data rate of present links |

Set BSat process 610 uses scan result list 336 and active link list 334 to find an alternate base station that is not linked to any other base station. In this example, set BSat process 610 determines that base stations 166 and 172 are not linked to any radio system. Because set BSat process 610 searches for an alternate base station for radio system 220 of eTWLU 110 (e.g., RSo), set BSat process 610 compares the estimated data rates for a possible link between radio system 220 of eTWLU 110 and base stations 166 and 172. In this example, the estimated data rates between radio system 220 of eTWLU 110 and base stations 166 and 172 are 14.5 and 19.83 Mbit/s. Set BSat process 610 sets base station 172 as Bsat because base station 172 has the highest data rate of the base stations that does not have a link with a radio system.

Sum proposed process 612 sums the estimated data rate of a proposed link between radio system 220 of eTLWU 110 (e.g., RSo) and base station 172 (e.g., BSat) and the estimated data rate of a proposed link between radio system 210 of eTWLU 110 (e.g., RSc) and base station 170 (e.g., BShd). In this example, the sum is (19.83+22.3) Mbit/s, so the variable D1 is set to the value 42.13 Mbit/s.

Sum present process 614 sums the estimated and/or actual data rate of a present link between radio system 210 of eTLWU 110 (e.g., RSc) and base station 160 (e.g., BSc) and the estimated and/or actual data rate of a present link between radio system 220 of eTWLU 110 (e.g., RSo) and base station 170 (e.g., BShd). In this example, the sum is (2.49+22.3) Mbit/s, so the variable D2 is set to the value 24.79 Mbit/s. Prior to starting execution of compare process 616, the temporary variables of Table 13 have the values shown below.

TABLE 13

Temporary Variables Example

| Variable | Value | Note |
|---|---|---|
| RSc | eTWLU_110_RS_ID_210 | |
| BSc | BS_160 | |
| BShd | BS_170 | |
| Data rate RSc - BSc | 2.49 Mbit/s | Data rate between RSc and BSc |
| Data rate RSc - BShd | 22.3 Mbit/s | Data rate between RSc and BShd |
| BShd linked to? | eTWLU_110_RS_ID_220 | |
| RSo | eTWLU_110_RS_ID_220 | |
| Data rate RSo - BShd | 22.3 Mbit/s | Data rate between RSo and BShd |
| BSat | BS 172 | |
| Data rate RSo - BSat | 19.83 Mbit/s | Data rate between RSo and BSat |
| DR1 | 41.13 Mbit/s | Combined data rate of proposed links |
| DR2 | 24.79 Mbit/s | Combined data rate of present links |

Compare process 616 determines whether the data rate of the proposed links is greater than the data rate of the presently established (e.g., active) links. In this example, the data rate of the proposed links (e.g., 41.13 Mbit/s) is greater than the data rate of the presently established links (e.g., 24.79 Mbit/s). Because DR1 is greater than DR2, control passes to link process 618.

Link process 618 terminates the link between radio system 210 of eTWLU 110 (e.g., RSc) and base station 160 (e.g., BSc). Link process 618 terminates the link between radio system 220 of eTWLU 110 (e.g., RSo) and base station 170 (e.g., BShd). Link process establishes a link between radio system 210 of eTWLU 110 (e.g., RSc) and base station 170 (e.g., BShd) and a link between radio system 220 of eTWLU 110 (e.g., RSo) and base station 172 (e.g., BSat). Link process updates the information in active link list 334 to record the now active links.

Prior to execution of method 500, the combine data rate of all of the links between radio systems 210-230 of eTWLU 110 and eTWLU 220 and the base stations at the location was 88.06 Mbit/s (e.g., 2.49+22.3+32+6.44+19.83+5). After execution of method 500, the combine data rate of all of the links between radio systems and the base stations at the location is 105.4 Mbit/s (e.g., 22.3+19.83+32+6.44+19.83+5).

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below.

What is claimed is:

1. A method for a communication system to communicate with a plurality of base stations, the communication system positioned onboard a vehicle, the base stations positioned at a location, communication occurring while the vehicle is positioned on the ground at the location, the method comprising:

determining the respective interval of each timer of a plurality of timers in accordance with a quality of a link between a radio system associated with each timer and one base station of the plurality of base stations, each timer associated with one radio system of a plurality of radio systems, each timer provides a notice in accordance with an expiration of a respective interval;

responsive to receiving the notice from any one timer, instructing the radio system associated with the timer that provided the notice to perform a scan to determine a respective data rate of the link between the radio system associated with the timer and each base station of the plurality of base stations; and instructing each radio system to communicate with a particular base station so that the sum of the respective data rates between the radios and the base stations is a maximum.

2. The method of claim 1, wherein the determining the respective interval of each timer of a plurality of timers in accordance with a quality of a link between a radio system associated with each timer and one base station of the plurality of base stations, comprises:

determining the respective interval of each timer of the plurality of timers inversely relative to the quality of the link.

3. The method of claim 1, wherein the determining the respective interval of each timer of a plurality of timers in accordance with a quality of a link between a radio system associated with each timer and one base station of the plurality of base stations, comprises:

determining the respective interval of each timer of the plurality of timers based on an exponential moving average of a carrier to noise plus interference ratio of the link.

4. The method of claim 1, wherein the determining the respective interval of each timer of a plurality of timers in accordance with a quality of a link between a radio system associated with each timer and one base station of the plurality of base stations, comprises:

determining the respective interval of each timer of the plurality of timers based on a received signal level of the link.

5. The method of claim 4, wherein the determining the respective interval of each timer of the plurality of timers based on a received signal level of the link, comprises:

determining the respective interval of each timer of the plurality of timers based on an exponential moving average of a received signal level of the link.

6. The method of claim 1, wherein the determining the respective interval of each timer of a plurality of timers in accordance with a quality of a link between a radio system associated with each timer and one base station of the plurality of base stations, comprises:

determining the respective interval of each timer of the plurality of timers based on a signal-to-noise ratio of the link.

7. The method of claim 1, further comprising:

prior to instructing the radio system associated with the timer that provided the notice to perform a scan, determining a first sum of data rates of all communication links between the plurality of radio systems and the plurality of base stations;

responsive to the scan performed by the radio system associated with the timer that provided the notice, instructing the radio system associated with the timer that provided the notice to establish a first communication link with a first base station of the plurality of base stations at a first data rate, instructing a second radio system of the plurality of radio systems to establish a second communication link with a second base station of the plurality of base stations at a second data rate, wherein responsive to establishing the first communication link and the second communication link, determining a second sum of the data rates of all communication links between the plurality of radio systems and the plurality of base stations, wherein the second sum is greater than the first sum.

8. The method of claim 7, wherein the first data rate is greater than all other data rates between the radio system associated with the timer that provided the notice and any other base station.

9. The method of claim 7, wherein prior to instructing the radio system associated with the timer that provided the notice to perform a scan, the second base station does not have a communication link with any other base station.

10. The method of claim 7, wherein each data rate is determined based on an estimated data rate in accordance with a quality of the communication link between the radio system and the respective base station.

11. The method of claim 1, wherein the plurality of radio systems and the plurality of base stations communicate using a WiMax wireless communication protocol.

12. The method of claim 1, wherein the plurality of radio systems and the plurality of base stations communicate using a WiFi wireless communication protocol.

* * * * *

UNITED STATES PATENT AND TRADEMARK OFFICE
CERTIFICATE OF CORRECTION

| | | |
|---|---|---|
| PATENT NO. | : 9,037,178 B1 | Page 1 of 1 |
| APPLICATION NO. | : 14/295210 | |
| DATED | : May 19, 2015 | |
| INVENTOR(S) | : Grochla et al. | |

It is certified that error appears in the above-identified patent and that said Letters Patent is hereby corrected as shown below:

In the Specification:
Column 7, Line 23: Please correct "eTWLU 110 RS_ID 210."
                      to read -- eTWLU_110_RS_ID_210. --

Column 18, Line 16: Please correct "Scan RS_ID."
                      to read -- Scan_RS_ID. --

Column 18, Line 22: Please correct "Scan RS_ID"
                      to read -- Scan_RS_ID --

Column 23, Line 20: Please correct "eTWLU 110 RS_ID 210,"
                      to read -- eTWLU_110_RS_ID 210, --

Signed and Sealed this
Second Day of February, 2016

Michelle K. Lee
*Director of the United States Patent and Trademark Office*